United States Patent
Wang et al.

(10) Patent No.: US 9,042,550 B2
(45) Date of Patent: May 26, 2015

(54) METHODS AND APPARATUS FOR BASE STATION ASSISTED PEER DISCOVERY THROUGH AGGREGATION OF EXPRESSIONS

(75) Inventors: Hua Wang, Bridgewater, NJ (US); Junyi Li, Chester, NJ (US); Shailesh Patil, Bridgewater, NJ (US); Sanjay Shakkottai, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 13/436,140

(22) Filed: Mar. 30, 2012

(65) Prior Publication Data

US 2013/0259231 A1 Oct. 3, 2013

(51) Int. Cl.
| | |
|---|---|
| *H04K 1/00* | (2006.01) |
| *H04W 8/00* | (2009.01) |
| *H04W 48/08* | (2009.01) |
| *H04W 88/02* | (2009.01) |
| *H04W 88/08* | (2009.01) |
| *H04W 88/06* | (2009.01) |
| *H04W 12/06* | (2009.01) |
| *H04W 12/02* | (2009.01) |

(52) U.S. Cl.
CPC .............. *H04W 8/005* (2013.01); *H04W 48/08* (2013.01); *H04W 88/02* (2013.01); *H04W 88/08* (2013.01); *H04W 88/06* (2013.01); *H04W 12/06* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 6,850,734 B1* | 2/2005 | Bruno et al. | 455/63.1 |
| 7,908,389 B2 | 3/2011 | Zuckerman et al. | |
| 2005/0237956 A1 | 10/2005 | Kuperschmidt et al. | |
| 2005/0250469 A1* | 11/2005 | Laroia et al. | 455/403 |
| 2007/0226362 A1 | 9/2007 | Johnson et al. | |
| 2008/0037487 A1* | 2/2008 | Li et al. | 370/338 |
| 2009/0016255 A1 | 1/2009 | Park | |
| 2009/0016353 A1 | 1/2009 | Li et al. | |
| 2009/0323647 A1 | 12/2009 | Park et al. | |
| 2009/0327395 A1* | 12/2009 | Park et al. | 709/202 |
| 2010/0150048 A1 | 6/2010 | Tsai et al. | |

(Continued)

FOREIGN PATENT DOCUMENTS

| | | |
|---|---|---|
| WO | WO-2008004102 A2 | 1/2008 |
| WO | WO-2009158652 A1 | 12/2009 |

OTHER PUBLICATIONS

International Search Report and Written Opinion—PCT/US2013/034448—ISA/EPO—Jul. 19, 2013.

*Primary Examiner* — Fatoumata Traore
(74) *Attorney, Agent, or Firm* — James K. O'Hare

(57) ABSTRACT

A method, an apparatus, and a computer program product for wireless communication are provided in which a UE is equipped to generate an expression associated with a wireless device for use in a peer discovery signal, generate an expression set from the expression, a first temporal frequency, and a first time duration, and transmit the generated expression set to a base station to allow the base station to broadcast each of the expressions included in the expression set at the first temporal frequency over the first time duration. Another method, apparatus, and computer program product for wireless communication are provided in which a base station is equipped to receive an expression set from a wireless device, process the received expression set to determine each of one or more instances of an expression, and transmit each of the one or more instances of the expression.

62 Claims, 11 Drawing Sheets

(56) References Cited

U.S. PATENT DOCUMENTS

2010/0254308 A1* 10/2010 Laroia et al. ................ 370/328
2010/0272029 A1  10/2010 Laroia et al.
2010/0272081 A1  10/2010 Laroia et al.
2011/0039592 A1  2/2011  Haddad et al.
2011/0128972 A1  6/2011  Thornton et al.
2012/0207297 A1  8/2012  Tian et al.
2014/0010108 A1  1/2014  Tavildar et al.

* cited by examiner

METHODS AND APPARATUS FOR BASE STATION ASSISTED PEER DISCOVERY THROUGH AGGREGATION OF EXPRESSIONS

BACKGROUND

1. Field

The present disclosure relates generally to communication systems, and more particularly, to base station assisted peer discovery to facilitate efficient peer-to-peer (P2P) communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

For many applications (e.g., social networking applications) it is important for a device to discover other devices within the vicinity. A device may broadcast a peer discovery signal which conveys an "expression" that can identify itself. The peer discovery information is usually very small. Note that although the peer discovery information may be fixed in a long time period, the bits that encode this information may change rapidly due to privacy concerns. The device may also need to detect other devices' peer discovery signal. Due to the fast decaying of radio signals, a device may not be able to directly detect another peer device's peer discovery signal. Further, different devices may operate in different frequency bands or under different operators, and it may not be feasible for a device to transmit/receive in all possible bands to detect all other device's peer discovery signal.

Base stations can receive peer devices' peer discovery information, exchange this information among base stations, and rebroadcast the information so that peer devices in a wide area may discover each other. With base station relayed peer discovery, periodic transmission of time varying peer discovery expressions to the base station may cause an excessive amount of short message traffic in the wide area network (WAN) and may result in excessive overhead communications. Therefore, a system and method to assist in facilitating efficient communication of a peer-to-peer communication discovery expression is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with base station assisted discovery to enable P2P communications. In one example, a UE is equipped to generate an expression associated with a wireless device for use in a peer discovery signal, generate an expression set from the expression, a first temporal frequency, and a first time duration, and transmit the generated expression set to a base station to allow the base station to broadcast each of the expressions included in the expression set at the first temporal frequency over the first time duration. In another example, a base station is equipped to receive an expression set from a wireless device, process the received expression set to determine each of one or more instances of an expression, and transmit each of the one or more instances of the expression.

According to related aspects, a method for base station assisted P2P discovery is provided. The method can comprise generating an expression associated with a wireless device for use in a peer discovery signal. Further, the method can include generating an expression set from the expression, a first temporal frequency, and a first time duration. Moreover, the method may include transmitting the generated expression set to a base station to allow the base station to broadcast each of the expressions included in the expression set at the first temporal frequency over the first time duration.

Another aspect relates to a wireless communications apparatus enabled to use base station assistance for P2P discovery. The wireless communications apparatus can include means for generating an expression associated with a wireless device for use in a peer discovery signal. Further, the wireless communications apparatus can include means for generating an expression set from the expression, a first temporal frequency, and a first time duration. Moreover, the wireless communications apparatus can include means for transmitting the generated expression set to a base station to allow the base station to broadcast each of the expressions included in the expression set at the first temporal frequency over the first time duration.

Another aspect relates to a wireless communications apparatus. The apparatus can include a processing system configured to generate an expression associated with a wireless device for use in a peer discovery signal. Further, the processing system may be configured to generate an expression set from the expression, a first temporal frequency, and a first time duration. Moreover, the processing system may further be configured to transmit the generated expression set to a base station to allow the base station to broadcast each of the expressions included in the expression set at the first temporal frequency over the first time duration.

Still another aspect relates to a computer program product, which can have a computer-readable medium including code for generating an expression associated with a wireless device for use in a peer discovery signal. Further, the computer-readable medium can include code for generating an expression set from the expression, a first temporal frequency, and a first time duration. Moreover, the computer-readable medium can include code for transmitting the generated expression set to a base station to allow the base station to broadcast each of the expressions included in the expression set at the first temporal frequency over the first time duration.

According to related aspects, a method for base station assisted P2P discovery is provided. The method can comprise receiving an expression set from a wireless device, wherein the expression set includes one or more instances of an expression, a first temporal frequency, and a first duration of time. Further, the method can include processing the received expression set to determine each of one or more instances of an expression for transmission at the first temporal frequency over the first duration of time. Moreover, the method may include transmitting each of the one or more instances of the expression at the first temporal frequency during the first duration of time.

Another aspect relates to a wireless communications apparatus enabled to use base station assistance for P2P discovery. The wireless communications apparatus can include means for receiving an expression set from a wireless device, wherein the expression set includes one or more instances of an expression, a first temporal frequency, and a first duration of time. Further, the wireless communications apparatus can include means for processing the received expression set to determine each of one or more instances of an expression for transmission at the first temporal frequency over the first duration of time. Moreover, the wireless communications apparatus can include means for transmitting each of the one or more instances of the expression at the first temporal frequency during the first duration of time.

Another aspect relates to a wireless communications apparatus. The apparatus can include a processing system configured to receive an expression set from a wireless device, wherein the expression set includes one or more instances of an expression, a first temporal frequency, and a first duration of time. Further, the processing system may be configured to process the received expression set to determine each of one or more instances of an expression for transmission at the first temporal frequency over the first duration of time. Moreover, the processing system may further be configured to transmit each of the one or more instances of the expression at the first temporal frequency during the first duration of time.

Still another aspect relates to a computer program product, which can have a computer-readable medium including code for receiving an expression set from a wireless device, wherein the expression set includes one or more instances of an expression, a first temporal frequency, and a first duration of time. Further, the computer-readable medium can include code for processing the received expression set to determine each of one or more instances of an expression for transmission at the first temporal frequency over the first duration of time. Moreover, the computer-readable medium can include code for transmitting each of the one or more instances of the expression at the first temporal frequency during the first duration of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
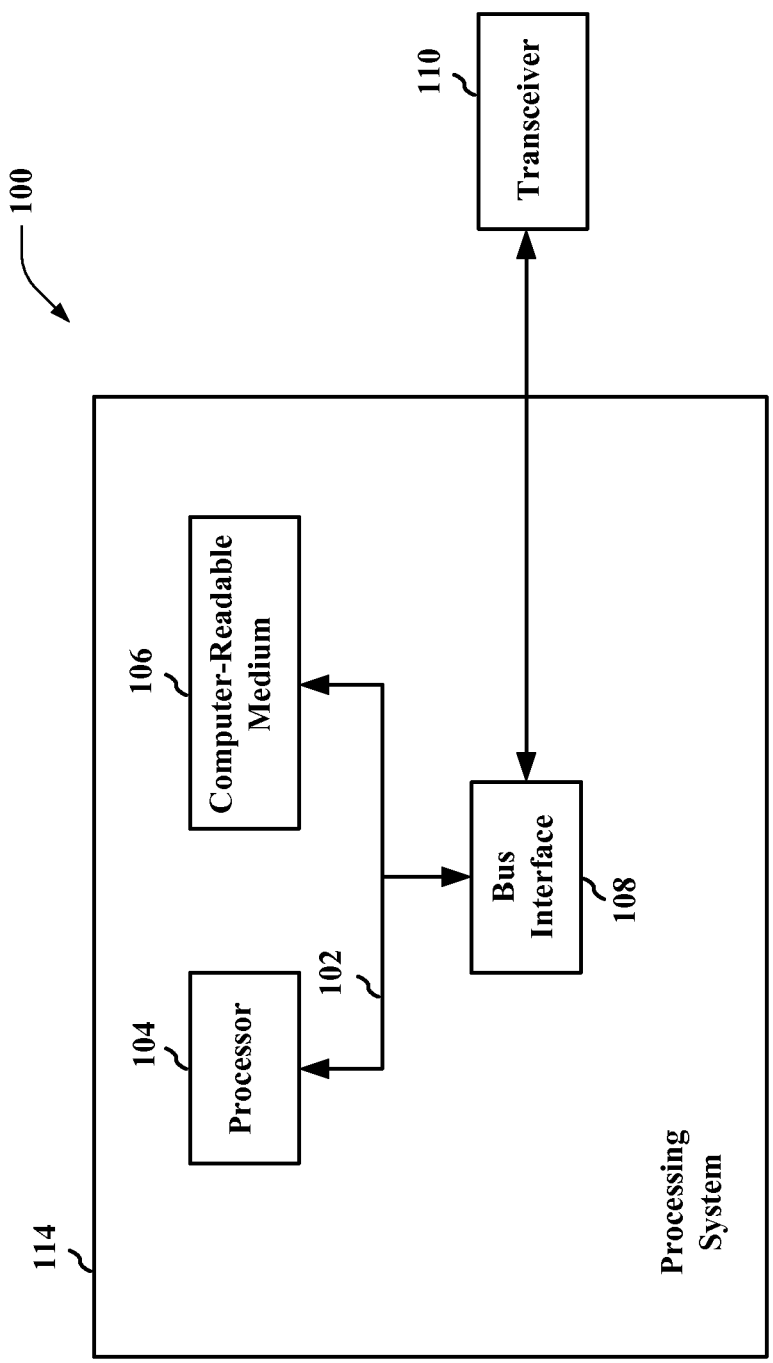
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
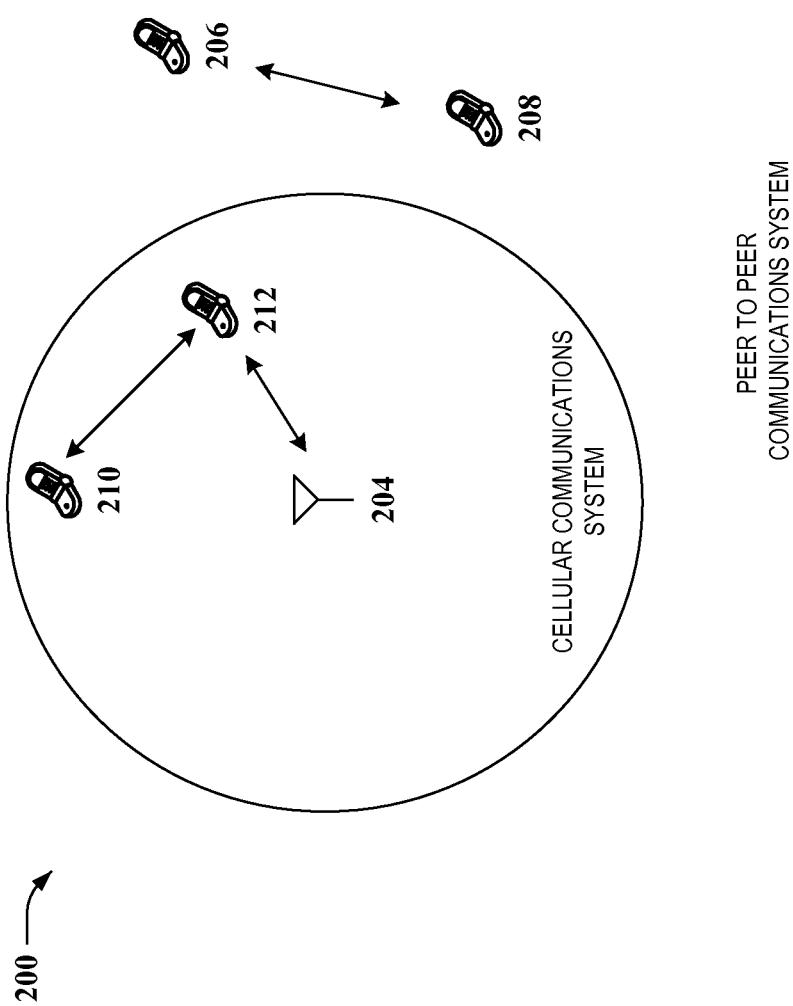
FIG. 2 is a diagram of a wireless peer-to-peer communications system.

FIG. 2 is a drawing of an exemplary peer-to-peer communications system 200.

The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
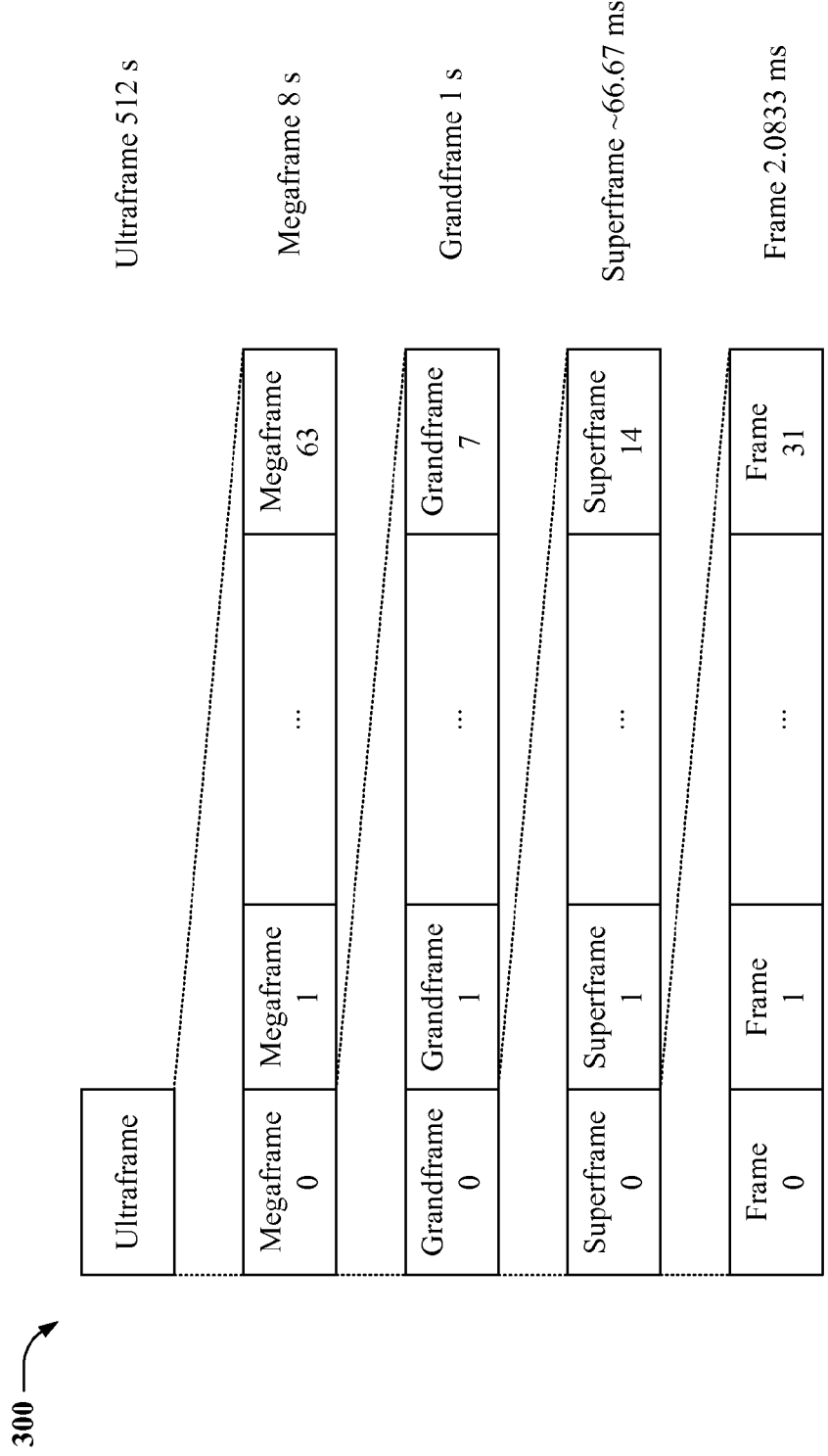
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
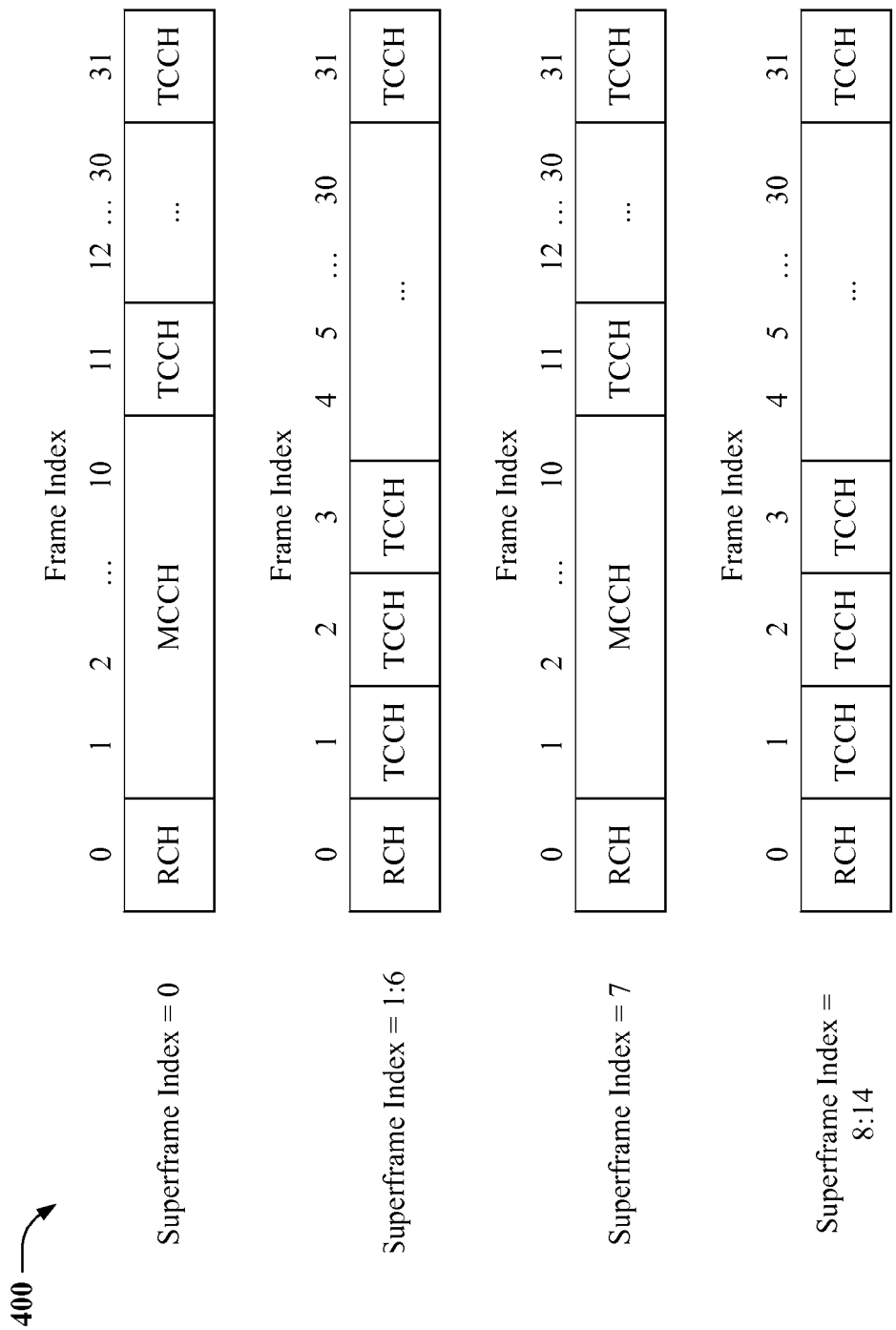
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
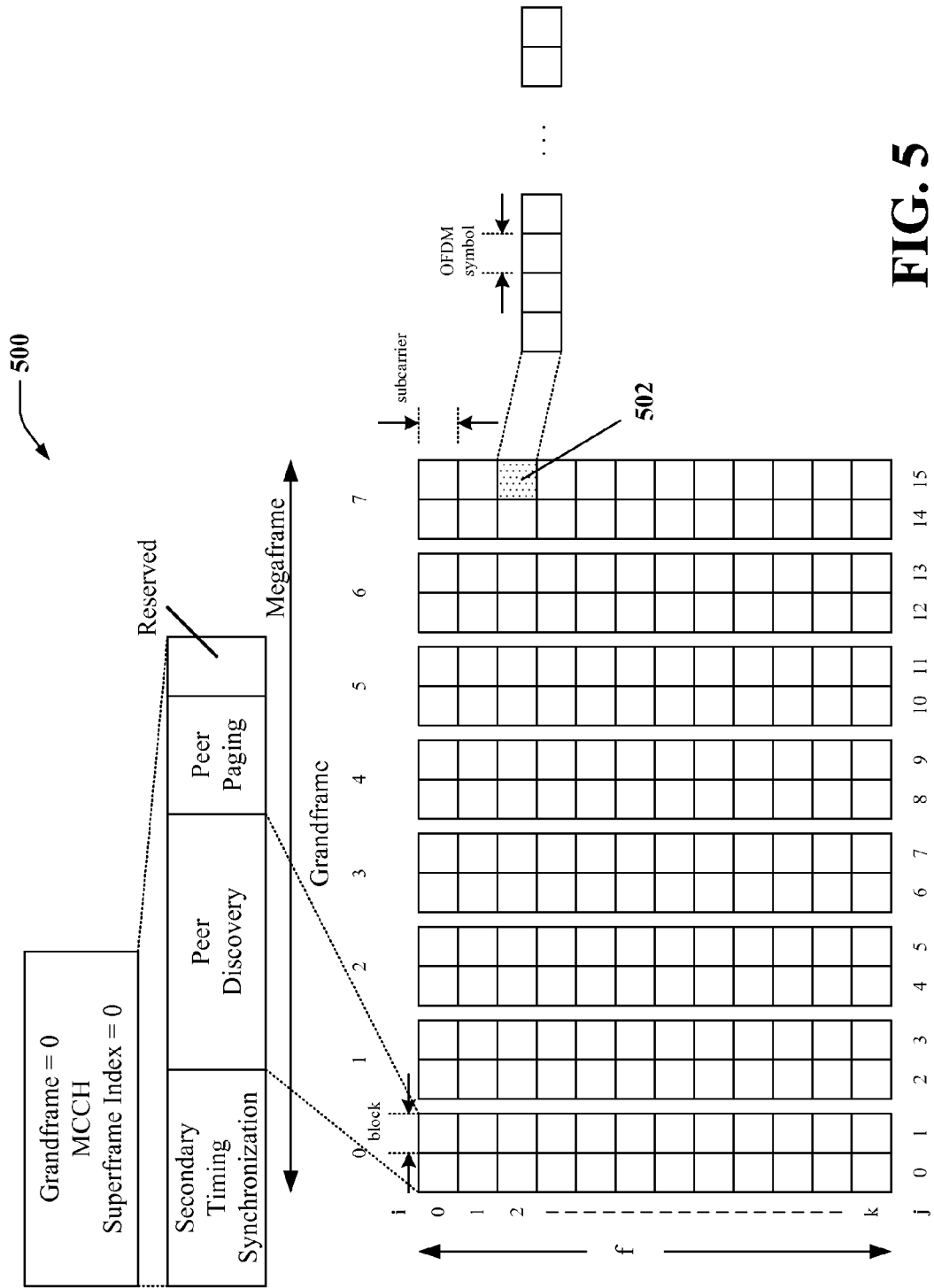
FIG. 5 is a diagram illustrating an operation timeline of a miscellaneous channel and a structure of a peer discovery channel.

FIG. 5 is a diagram 500 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 502 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding its PDRID and the detected energies on the other peer discovery resources corresponding to other PDRIDs.

Figure 6:
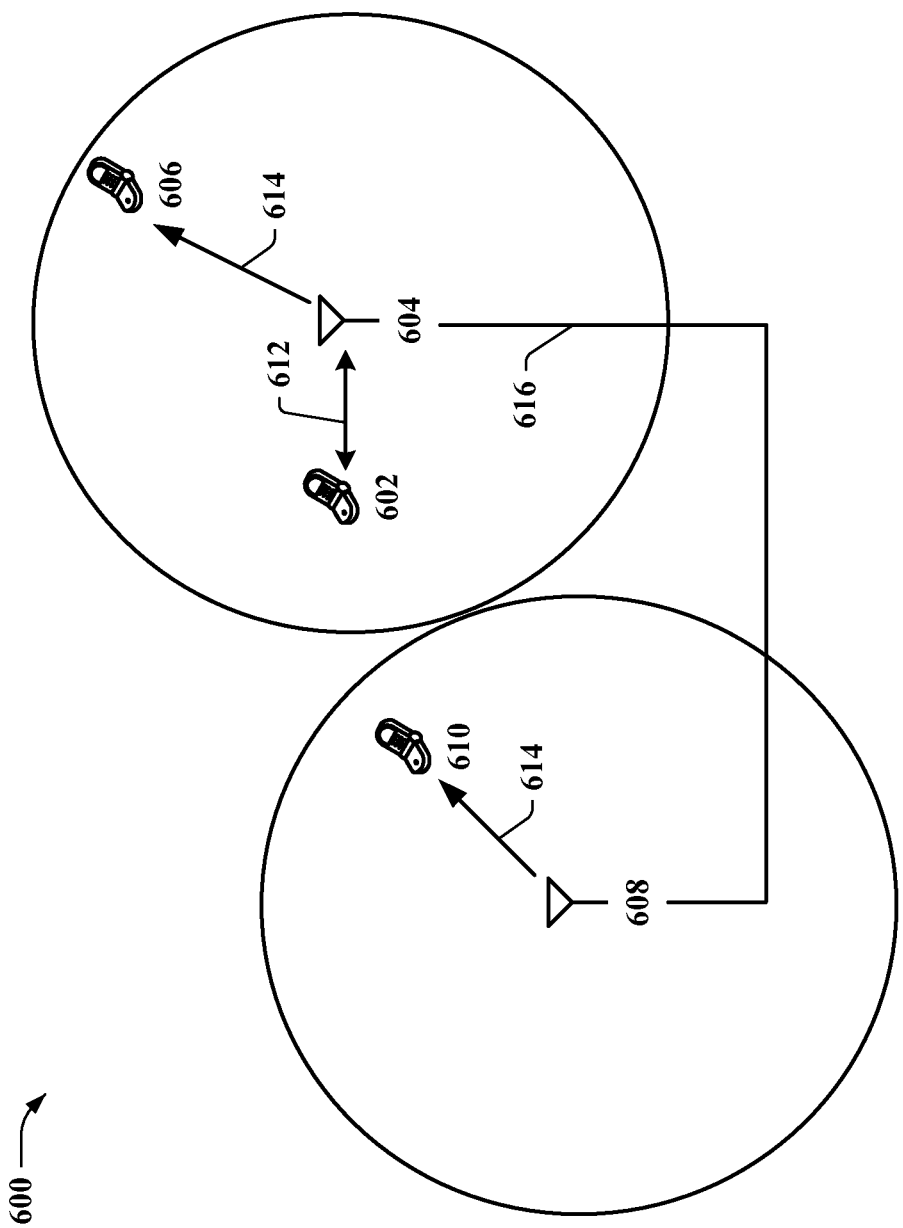
FIG. 6 is a diagram of a wireless wide area network communications system operable to support peer-to-peer communications according to an aspect.

FIG. 6 is a drawing of an exemplary wireless wide area network (WWAN) communications system 600. The peer-to-peer communications system 600 includes a plurality of wireless devices 602, 606, 610, and may include one or more base stations 604, 608. In one aspect, base stations 604 and 608 may be connected over a network connection 616.

Wireless device 602 may generate an expression for discovery for peer-to-peer communications. As used herein an expression may be a unique naming structure defined by an application and may allow applications to discover one another. In one aspect, an expression may include a public expression and/or a private expression. A public expression may include an expression name and a corresponding expression code that may be efficiently transmitted over the air. Further, a private expression includes an expression name and a corresponding expression key that may have a time-varying hash function applied to them prior to being sent over the air. One way to keep the expression private is encryption. The device 602 may generate a private expression and a particular group of devices may share a common key, which may be used to encrypt/decrypt the private expression. This key may be changed from time to time and the key sequence as a function of time may be known by the device 602 and the group of devices with which the device 602 intends to share (e.g., 606). As such, devices with the key sequence can decrypt the expression. In one aspect, the expression may be included in a short bit string. For example, in FlashLinQ, the expression may include 70 bits of information. Further, in one aspect, a device's expression can be time variant.

Further, wireless device 602 may process the expression to generate an expression set 612. In one aspect, the expression set 612 may be aggregated over a period of time and sent to the base station 604 using an uplink channel. As an example, the expression may be 70 bits long, and a peer discovery period may be 8 ms. Device 602 may aggregate all the expressions over the next hour (e.g., approximately 4K byte) in a packet and send the packet (e.g., expression set 612) to the base station. After receiving the aggregated expression set 612, the base station can reproduce the 70 bits expression for each 8 ms peer discover period and broadcast only the corresponding 70 bits expression 614 every 8 ms. In one aspect, base station 604 may communicate the expression set 612 and/or the expression 614 over the network connection 616 to base station 608 to transmit the expression. In such an aspect, wireless device 610 may receive the expression 614 associated with wireless device 602 even though it is served by a different base station 608. In one aspect, base station 604 may receive the expression set 612 using a first frequency band and may transmit the expression 614 using one or more other frequency bands.

Figure 7:
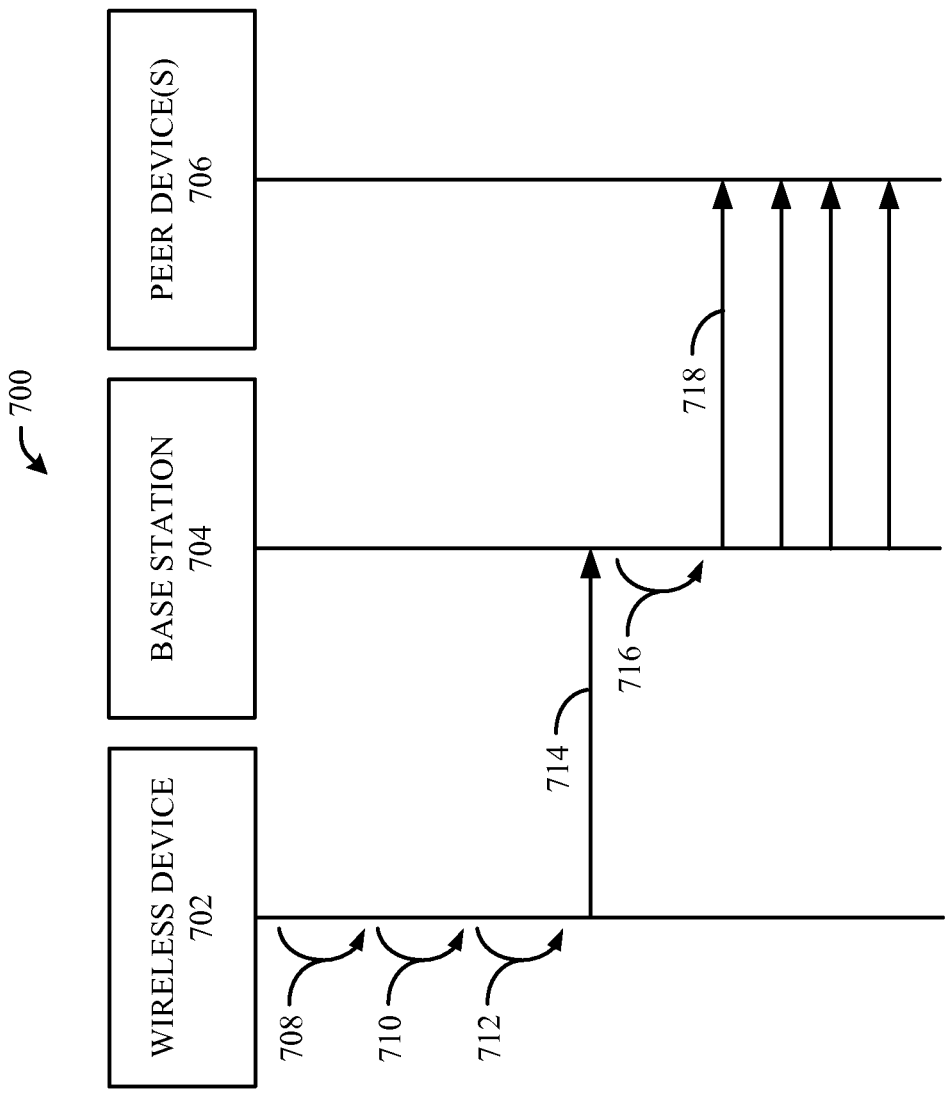
FIG. 7 is a call flow diagram illustrating communications between a wireless device and a base station in a wireless peer-to-peer communications system.

FIG. 7 illustrates an example wireless communications network 700 including wireless device 702, base station 704, and one or more peer devices 706. Wireless communications network 700 allows for improved base station assisted peer discovery processes to be implemented in a peer-to-peer network.

At act 708, a wireless device 702 may generate an expression to be communicated as part of a peer discovery process.

At act 710, the wireless device 702 may preprocess the expression so as to make the information accessible to various peer devices 706. For example, the expression may be preprocessed as a private expression. One way to keep the expression private is encryption. The wireless device 702 with the private expression and a particular group of devices 706 may share a common key, which is used to encrypt/decrypt the expression. In one aspect, the key may be changed from time to time. In such an aspect, this key sequence, as a function of time, may be known by the device 702 and the group of devices 706. Thus only devices with the key sequence can decrypt the expression.

At act 712, the wireless device 702 may generate an aggregated expression value. In one aspect, wireless device 703 may aggregate expressions over a certain period of time. As an example, assume that the expression is 70 bits long, and the peer discovery period is 8 seconds. Wireless device 702 may aggregate all the expressions over the next hour (e.g., about 4K byte) into an aggregated expression packet. At act 714, the aggregated expression packet may be transmitted to base station 704.

At act 716, base station 704 may reproduce wireless device 702 expressions and at act 718, base station 704 may broadcast the expressions at a determined temporal frequency to various peer devices 706. In other words, after base station 704 receives the aggregated expression, the base station 704 can reproduce the 70 bits expression for each 8 second peer discover period and broadcast only the corresponding 70 bits expression every 8 seconds. In one aspect, if wireless device 702 does not want to be discovered by other devices 706, it may send a message (not shown) to the base station 704 to stop the broadcasting of its expression. As such, an uplink transmission may be used over a time duration (e.g., an hour), and overhead associated with sending expressions to the base station 704 may be greatly reduced.

Figure 8:
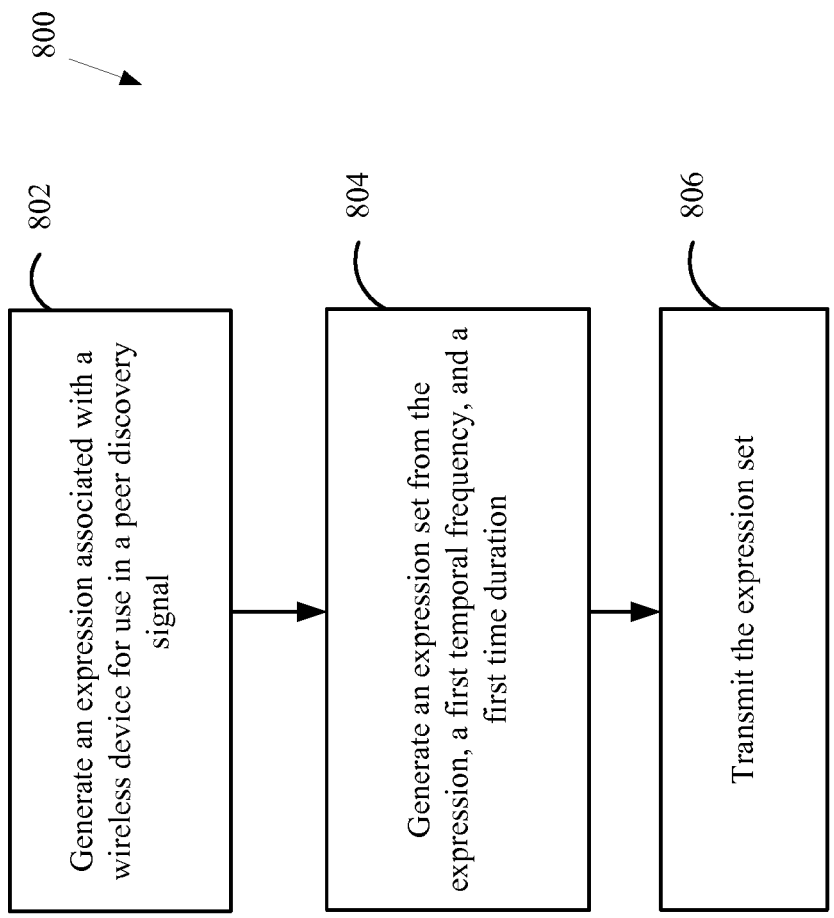
FIG. 8 is a flow chart of a method of wireless communication.

FIG. 8 is a flow chart 800 of an exemplary method. The method is performed by a wireless device. At block 802, the wireless device may generate an expression for use in a peer discovery signal. In one aspect, the expression may be encrypted using one or more keys. At block 804, the wireless device may generate an expression set from the expression, a temporal frequency and a time duration. In one aspect, the temporal frequency may be a temporal frequency used for broadcasting a peer discovery signal. In one aspect, the expression set may be encrypted using one or more keys. In another aspect, separately encrypted expressions may be aggregated into the expression set. At block 806, the wireless device may transmit the expression set to a base station for eventual broadcasting of the expressions at the temporal frequency during the time duration. In one aspect, one or more rules may also be transmitted with the expression set. In such an aspect, the rules may be used by the base station to process the expression set to obtain each expression. Further, the one or more rules may indicate how to change an expression over time. For example, a time dependent hash function may be used to obtain each expression from the expression set. In another example, one or more time dependent encryption keys may be applied to each expression from the expression set.

Figure 9:
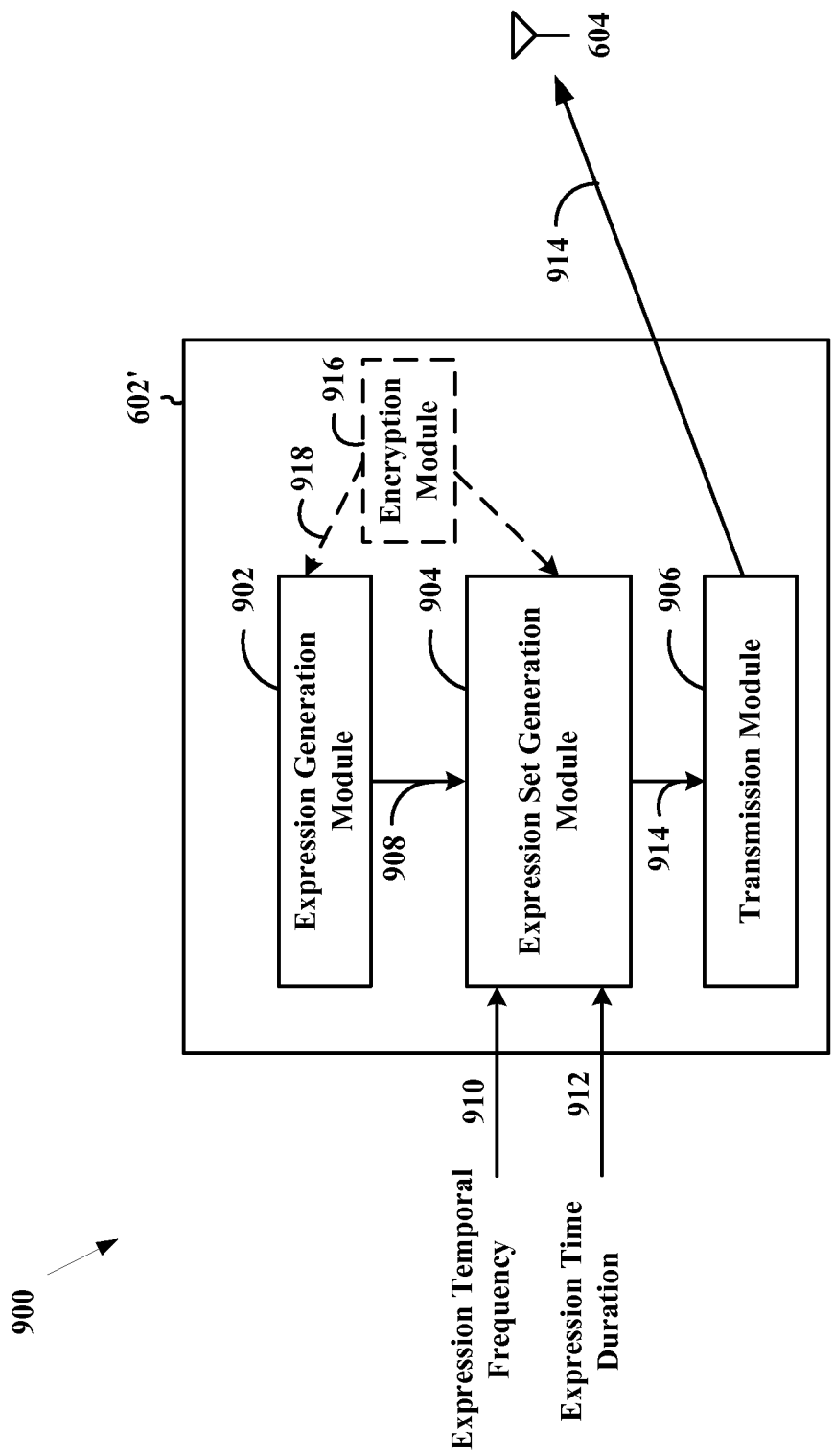
FIG. 9 is a conceptual block diagram illustrating the functionality of an exemplary apparatus.

FIG. 9 is a conceptual block diagram 900 illustrating the functionality of an exemplary apparatus 602'. The apparatus 602' includes an expression generation module 902 that is operable to generate an expression associated with the wireless device 602' for use in a peer discovery signal. The apparatus 602' may also include an expression set generation module 904 that is operable to generate an expression set from the expression 908, a temporal frequency 910 and a time duration 912. In such an aspect, the temporal frequency may coincide with a temporal frequency used for peer discovery transmissions. The apparatus 602' may further include a transmission module 906 that is operable to transmit the expression set 914 to a base station 604. In one aspect, transmission module 906 may further include one or more rules with the expression set 914 to assist base station 604 in derive the expression 908 from the expression set 914. In an optional aspect, apparatus 602' may further include an encryption module 916 that may be operable to encrypt expressions and/or expression sets using one or more keys 918. The apparatus 602' may include additional modules that perform each of the steps in the aforementioned flow charts. Each step in the aforementioned flow charts may be performed by a module and the apparatus 100/602' may include one or more of those modules.

Referring to FIGS. 1, 6, and 9, in one configuration, the apparatus 100/602/602' for wireless communication includes means for generating an expression associated with a wireless device for use in a peer discovery signal, means for generating an expression set from the expression, a first temporal frequency, and a first time duration, and means for transmitting the generated expression set to a base station to allow the base station to broadcast each of the expressions included in the expression set at the first temporal frequency over the first time duration. In one aspect, the means for generating an expression set may further include means for encrypting the expression set using one or more keys. In another aspect, the means for generating an expression set may further include means for encrypting each expression separately in the expression set, and means for aggregating each separately encrypted expression into the expression set. In one aspect, the means for transmitting may further include means for transmitting one or more rules for generating an expression to transmit based on each expression in the expression set. In such an aspect, the one or more rules may include information indicating how to change the expression over time. The aforementioned means is the processing system 114 configured to perform the functions recited by the aforementioned means.

Figure 10:
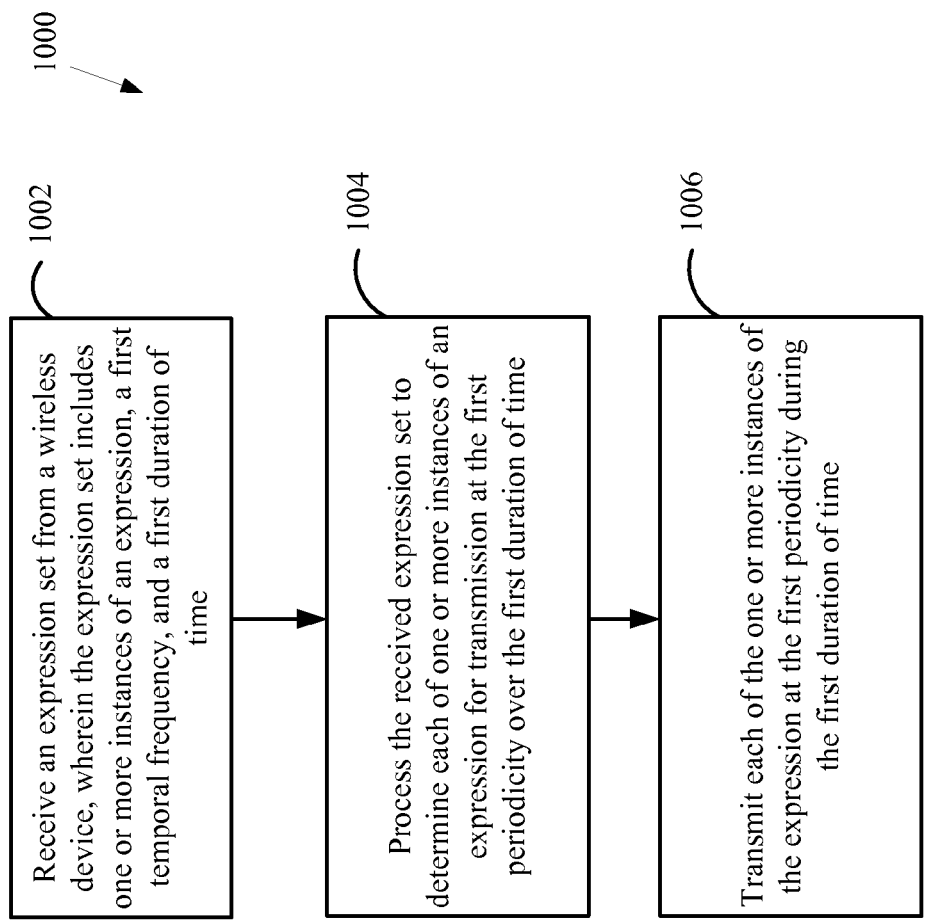
FIG. 10 is a flow chart of another method of wireless communication.

FIG. 10 is a flow chart 1000 of an exemplary method. The method is performed by a wireless device. At block 1002, the base station may receive an expression set from a wireless device including one or more instances of an expression, a temporal frequency and a time duration. In one aspect, the expression set may be received in a first frequency band. In one aspect, the expression set is encrypted used one or more keys. In such an aspect, the expression set may be decrypted by the base station and/or each expression may be separately decrypted by the base station. Further, the base station may re-encrypt each expression in the expression set prior to a subsequent transmission.

At block 1004, the received expression set may be processed to obtain each instance of an expression. In one aspect, the expression set may be received with one or more rules to assist the base station in processing the received expression set. In such an aspect, the one or more rules may include information indicating how to change the expression over time. For example, a time dependent hash function may be used on each expression from the expression set. In another example, one or more time dependent encryption keys may be applied to each expression from the expression set.

At block 1006, the base station may transmit each instance of the expression at the determined temporal frequency for the duration of time. In one aspect, the base station may transmit each instance of the expression to one or more other base stations to allow the one or more other base station to also transmit the expression. In another aspect, the base station may transmit the expression set to the one or more other base stations to allow the one or more other base stations to extract and to transmit the expression.

Figure 11:
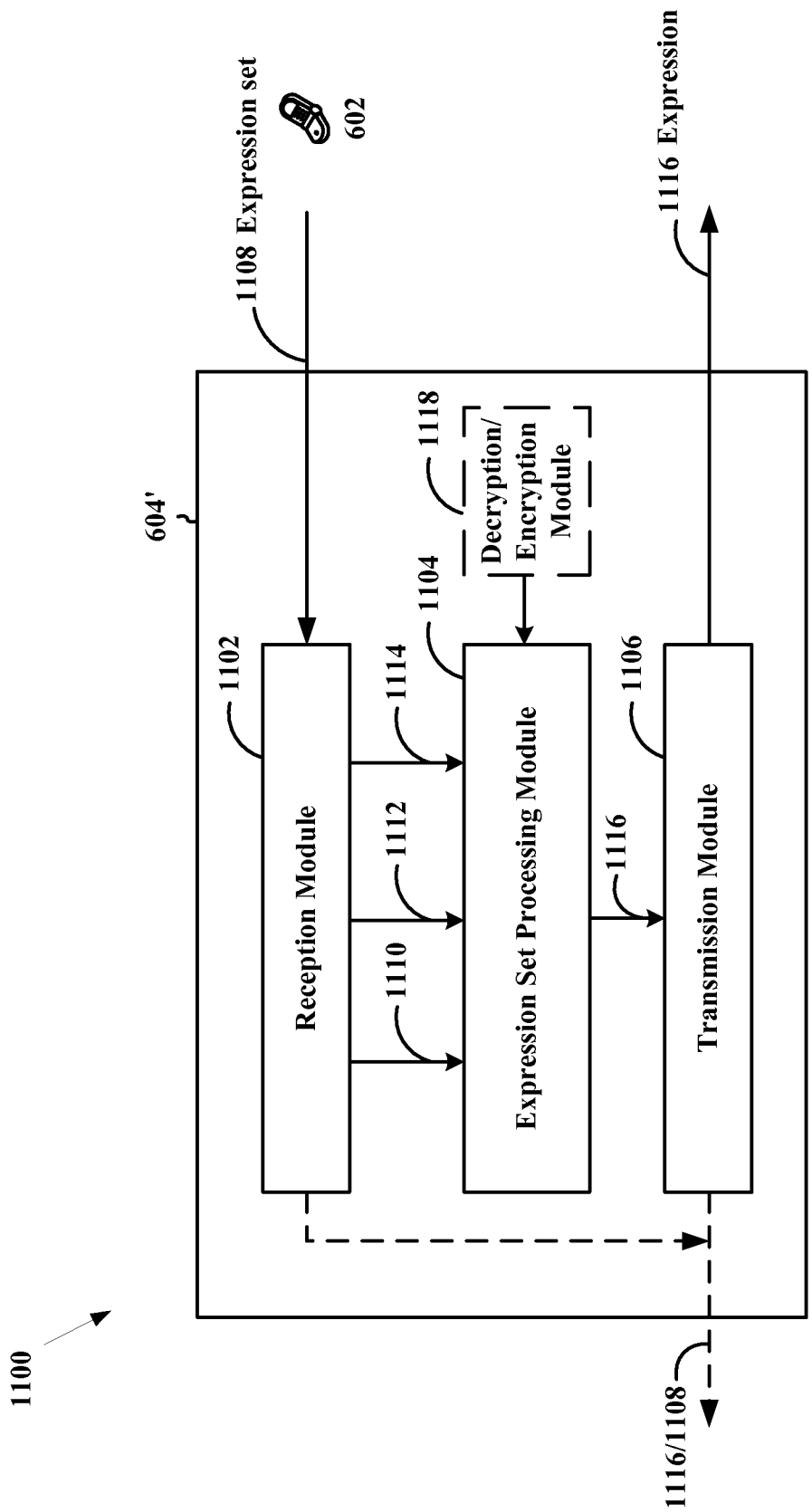
FIG. 11 is a conceptual block diagram illustrating the functionality of another exemplary apparatus.

FIG. 11 is a conceptual block diagram 1100 illustrating the functionality of an exemplary apparatus 604'. The apparatus 604' includes a reception module 1102 that is operable to receive an expression set 1108 from a wireless device 602. In one aspect, the expression set may also be received one or more rules to assist in processing the expression set. Further, the expression set 1108 may include one or more instances of an expression 1110, a temporal frequency 1112, and a time duration 1114. The apparatus 604' may further include expression set processing module 1104 that may be operable determine each of the one or more instance of an expression 1116 by processing the expression set 1108. In an optional aspect, where a received expression set 1108 is encrypted, decryption/encryption module 1118 may assist expression set processing module 1104 is decrypting and/or processing the encrypted expression set. The apparatus may further include transmission module 1106 that may transmit each expression 1116 at the temporal frequency 1112 for the time duration 1114. In one optional aspect, the apparatus 604' may communication at least one of the expression set 1108 or each instance of the expression to one or more other base stations to allow the one or more other base stations to transmit the expression. Further, in an optional aspect, where the each expression 1116 is encrypted, decryption/encryption module 1118 may assist expression set processing module 1104 is re-encrypting the expression 1116. In one aspect, transmission module 1106 may transmit the expression 1116 over a one or more different frequency bands than upon which the expression set 1108 was received. The apparatus 604' may include additional modules that perform each of the steps in the aforementioned flow charts. Each step in the aforementioned flow charts may be performed by a module and apparatuses 100/604' may include one or more of those modules.

Referring to FIGS. 1, 6, and 11, in one configuration, the apparatus 100/604/604' for wireless communication includes means for receiving an expression set from a wireless device, wherein the expression set includes one or more instances of an expression, a first temporal frequency, and a first duration of time, means for processing the received expression set to determine each of one or more instances of an expression for transmission at the first temporal frequency over the first duration of time, and means for transmitting each of the one or more instances of the expression at the first temporal frequency during the first duration of time. In one aspect, the means for receiving may further include means for receiving within a first frequency band, and the means for transmitting may further include means for transmitting within one or more other frequency bands. In one aspect, where the expression set is encrypted, the apparatus 704' may further include means for decrypting the encrypted expression set, and means for separately re-encrypt each expression in the expression set. In one aspect, where each expression is separately encrypted, the apparatus 704' may further include means for decrypting each expression in the expression set. In one aspect, the means for receiving may further include means for receiving one or more rules for generating an expression to transmit based on each expression in the expression set. In such an aspect, the one or more rules may include information indicating how to change the expression over time. In one aspect, the means for transmitting may further include means for transmitting each of the one or more instances of the expression to one or more other base stations to allow the one or more other base stations to transmit the one or more instances of the expression. In another aspect, the means for transmitting may further include means for transmitting the expression set to one or more other base stations to allow the one or more other base stations to process the expression set and transmit the one or more instances of the expression. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
    generating an expression associated with a wireless device for use in a peer discovery signal, wherein the expression includes at least one of a public expression or a private expression, and wherein the private expression includes an expression name and a corresponding expression key, and the private expression is encrypted using a time-varying hash function;

generating an expression set from the expression, a first temporal frequency indicating a periodicity for transmitting the expression in the expression set, and a first time duration; and transmitting the generated expression set that includes one or more instances of the expression, the first temporal frequency indicating a periodicity for transmitting the expression in the expression set, and the first time duration to a base station to allow the base station to broadcast each of the expressions included in the expression set at the first temporal frequency over the first time duration.

2. The method of claim 1, wherein the generating an expression set further comprises encrypting the expression set using one or more keys.

3. The method of claim 1, wherein the generating an expression set further comprises:
    encrypting each expression separately in the expression set; and
    aggregating each separately encrypted expression into the expression set.

4. The method of claim 1, wherein the first temporal frequency is a temporal frequency of broadcasting a peer discovery signal.

5. The method of claim 1, wherein the transmitting further comprises transmitting one or more rules for generating an expression to transmit based on each expression in the expression set.

6. The method of claim 5, wherein the one or more rules comprises information indicating how to change the expression over time.

7. A method of wireless communications, comprising:
    receiving an expression set from a wireless device, wherein the expression set includes one or more instances of an expression, a first temporal frequency indicating a periodicity for transmitting the expression in the expression set, and a first duration of time, wherein the expression includes at least one of a public expression or a private expression, and wherein the private expression includes an expression name and a corresponding expression key, and the private expression is encrypted using a time-varying hash function;

processing the received expression set to determine each of one or more instances of the expression for transmission at the first temporal frequency over the first duration of time; and transmitting each of the one or more instances of the expression at the first temporal frequency during the first duration of time.

8. The method of claim 7, wherein the receiving further comprises receiving within a first frequency band, and wherein the transmitting further comprises transmitting within one or more other frequency bands.

9. The method of claim 7, wherein the first temporal frequency is a temporal frequency of broadcasting a peer discovery signal.

10. The method of claim 7, wherein the expression set is encrypted using one or more keys and wherein the method further comprises:

decrypting the encrypted expression set; and separately re-encrypting each expression in the expression set.

11. The method of claim 7, wherein each expression in the expression set is separately encrypted by the wireless device, and wherein the method further comprises:

decrypting each expression in the expression set.

12. The method of claim 7, wherein the receiving further comprises receiving one or more rules for generating an expression to transmit based on each expression in the expression set.

13. The method of claim 12, wherein the one or more rules comprises information indicating how to change the expression over time.

14. The method of claim 7, wherein the transmitting further comprises transmitting each of the one or more instances of the expression to one or more other base stations to allow the one or more other base stations to transmit the one or more instances of the expression.

15. The method of claim 7, wherein the transmitting further comprises transmitting the expression set to one or more other base stations to allow the one or more other base stations to process the expression set and transmit the one or more instances of the expression.

16. An apparatus for wireless communications, comprising:

means for generating an expression associated with a wireless device for use in a peer discovery signal, wherein the expression includes at least one of a public expression or a private expression, and wherein the private expression includes an expression name and a corresponding expression key, and the private expression is encrypted using a time-varying hash function;

means for generating an expression set from the expression, a first temporal frequency indicating a periodicity for transmitting the expression in the expression set, and a first time duration; and means for transmitting the generated expression set that includes one or more instances of the expression, the first temporal frequency indicating a periodicity for transmitting the expression in the expression set, and the first time duration to a base station to allow the base station to broadcast each of the expressions included in the expression set at the first temporal frequency over the first time duration.

17. The apparatus of claim 16, wherein the means for generating an expression set is configured to encrypt the expression set using one or more keys.

18. The apparatus of claim 16, wherein the means for generating an expression set is configured to:

encrypt each expression separately in the expression set; and aggregate each separately encrypted expression into the expression set.

19. The apparatus of claim 16, wherein the first temporal frequency is a temporal frequency of broadcasting a peer discovery signal.

20. The apparatus of claim 16, wherein the means for transmitting is configured to transmit one or more rules for generating an expression to transmit based on each expression in the expression set.

21. The apparatus of claim 20, wherein the one or more rules comprises information indicating how to change the expression over time.

22. An apparatus for wireless communications, comprising:

means for receiving an expression set from a wireless device, wherein the expression set includes one or more instances of an expression, a first temporal frequency indicating a periodicity for transmitting the expression in the expression set, and a first duration of time, wherein the expression includes at least one of a public expression or a private expression, and wherein the private expression includes an expression name and a corresponding expression key, and the private expression is encrypted using a time-varying hash function;

means for processing the received expression set to determine each of one or more instances of the expression for transmission at the first temporal frequency over the first duration of time; and means for transmitting each of the one or more instances of the expression at the first temporal frequency during the first duration of time.

23. The apparatus of claim 22, wherein the means for receiving is configured to receive within a first frequency band, and wherein the means for transmitting is configured to transmit within one or more other frequency bands.

24. The apparatus of claim 22, wherein the first temporal frequency is a temporal frequency of broadcasting a peer discovery signal.

25. The apparatus of claim 22, wherein the expression set is encrypted using one or more keys, further comprising:

means for decrypting the encrypted expression set; and means for separately re-encrypting each expression in the expression set.

26. The apparatus of claim 22, wherein each expression in the expression set is separately encrypted by the wireless device, further comprising:

means for decrypting each expression in the expression set.

27. The apparatus of claim 22, wherein the means for receiving is configured to receive one or more rules for generating an expression to transmit based on each expression in the expression set.

28. The apparatus of claim 27, wherein the one or more rules comprises information indicating how to change the expression over time.

29. The apparatus of claim 22, wherein the means for transmitting is configured to transmit each of the one or more instances of the expression to one or more other base stations to allow the one or more other base stations to transmit the one or more instances of the expression.

30. The apparatus of claim 22, wherein the means for transmitting is configured to transmit the expression set to one or more other base stations to allow the one or more other base stations to process the expression set and transmit the one or more instances of the expression.

31. A computer program product, comprising:

a non-transitory computer-readable medium comprising code for:

generating an expression associated with a wireless device for use in a peer discovery signal, wherein the expression includes at least one of a public expression or a private expression, and wherein the private expression includes an expression name and a corresponding expression key, and the private expression is encrypted using a time-varying hash function;

generating an expression set from the expression, a first temporal frequency indicating a periodicity for transmitting the expression in the expression set, and a first time duration; and transmitting the generated expression set that includes one or more instances of the expression, the first temporal frequency indicating a periodicity for transmitting the expression in the expression set, and the first time duration to a base station to allow the base station to broadcast each of the expressions included in the expression set at the first temporal frequency over the first time duration.

32. The computer program product of claim 31, wherein the code for generating an expression set further comprises code for encrypting the expression set using one or more keys.

33. The computer program product of claim 31, wherein the code for generating an expression set further comprises code for:
   encrypting each expression separately in the expression set; and
   aggregating each separately encrypted expression into the expression set.

34. The computer program product of claim 31, wherein the first temporal frequency is a temporal frequency of broadcasting a peer discovery signal.

35. The computer program product of claim 31, wherein the code for transmitting further comprises code for transmitting one or more rules for generating an expression to transmit based on each expression in the expression set.

36. The computer program product of claim 35, wherein the one or more rules comprises information indicating how to change the expression over time.

37. The method of claim 1, wherein the expression set is aggregated over a period of time.

38. The method of claim 1, wherein the public expression includes an expression name and a corresponding expression code.

39. A computer program product, comprising:
   a non-transitory computer-readable medium comprising code for:
   receiving an expression set from a wireless device, wherein the expression set includes one or more instances of an expression, a first temporal frequency indicating a periodicity for transmitting the expression in the expression set, and a first duration of time, wherein the expression includes at least one of a public expression or a private expression, and wherein the private expression includes an expression name and a corresponding expression key, and the private expression is encrypted using a time-varying hash function;
   processing the received expression set to determine each of one or more instances of the expression for transmission at the first temporal frequency over the first duration of time; and
   transmitting each of the one or more instances of the expression at the first temporal frequency during the first duration of time.

40. The computer program product of claim 39, wherein the code for receiving further comprises code for receiving within a first frequency band, and wherein the code for transmitting further comprises code for transmitting within one or more other frequency bands.

41. The computer program product of claim 39, wherein the first temporal frequency is a temporal frequency of broadcasting a peer discovery signal.

42. The computer program product of claim 39, wherein the expression set is encrypted using one or more keys, and the computer-readable medium further comprises code for:
   decrypting the encrypted expression set; and
   separately re-encrypting each expression in the expression set.

43. The computer program product of claim 39, wherein each expression in the expression set is separately encrypted by the wireless device, and the computer-readable medium further comprises code for:
   decrypting each expression in the expression set.

44. The computer program product of claim 39, wherein the code for receiving further comprises code for receiving one or more rules for generating an expression to transmit based on each expression in the expression set.

45. The computer program product of claim 44, wherein the one or more rules comprises information indicating how to change the expression over time.

46. The computer program product of claim 39, wherein the code for transmitting further comprises code for transmitting each of the one or more instances of the expression to one or more other base stations to allow the one or more other base stations to transmit the one or more instances of the expression.

47. The computer program product of claim 39, wherein the code for transmitting further comprises code for transmitting the expression set to one or more other base stations to allow the one or more other base stations to process the expression set and transmit the one or more instances of the expression.

48. An apparatus for wireless communication, comprising:
   a processing system configured to:
   generate an expression associated with a wireless device for use in a peer discovery signal, wherein the expression includes at least one of a public expression or a private expression, and wherein the private expression includes an expression name and a corresponding expression key, and the private expression is encrypted using a time-varying hash function;
   generate an expression set from the expression, a first temporal frequency indicating a periodicity for transmitting the expression in the expression set, and a first time duration; and
   transmit the generated expression set that includes one or more instances of the expression, the first temporal frequency indicating a periodicity for transmitting the expression in the expression set, and the first time duration to a base station to allow the base station to broadcast each of the expressions included in the expression set at the first temporal frequency over the first time duration.

49. The apparatus of claim 48, wherein the processing system is further configured to encrypt the expression set using one or more keys.

50. The apparatus of claim 48, wherein the processing system is further configured to:
   encrypt each expression separately in the expression set; and
   aggregate each separately encrypted expression into the expression set.

51. The apparatus of claim 48, wherein the first temporal frequency is a temporal frequency of broadcasting a peer discovery signal.

52. The apparatus of claim 48, wherein the processing system is further configured to transmit one or more rules for generating an expression to transmit based on each expression in the expression set.

53. The apparatus of claim 52, wherein the one or more rules comprises information indicating how to change the expression over time.

54. An apparatus for wireless communications, comprising:
a processing system configured to:
receive an expression set from a wireless device, wherein the expression set includes one or more instances of an expression, a first temporal frequency indicating a periodicity for transmitting the expression in the expression set, and a first duration of time, wherein the expression includes at least one of a public expression or a private expression, and wherein the private expression includes an expression name and a corresponding expression key, and the private expression is encrypted using a time-varying hash function;
process the received expression set to determine each of one or more instances of the expression for transmission at the first temporal frequency over the first duration of time; and
transmit each of the one or more instances of the expression at the first temporal frequency during the first duration of time.

55. The apparatus of claim 54, wherein the processing system is further configured to:
receive within a first frequency band; and
transmit within one or more other frequency bands.

56. The apparatus of claim 54, wherein the first temporal frequency is a temporal frequency of broadcasting a peer discovery signal.

57. The apparatus of claim 54, wherein the expression set is encrypted using one or more keys, wherein the processing system is further configured to:
decrypt the encrypted expression set; and
separately re-encrypt each expression in the expression set.

58. The apparatus of claim 54, wherein each expression in the expression set is separately encrypted by the wireless device, wherein the processing system is further configured to:
decrypt each expression in the expression set.

59. The apparatus of claim 54, wherein the processing system is further configured to receive one or more rules for generating an expression to transmit based on each expression in the expression set.

60. The apparatus of claim 59, wherein the one or more rules comprises information indicating how to change the expression over time.

61. The apparatus of claim 54, wherein the processing system is further configured to transmit each of the one or more instances of the expression to one or more other base stations to allow the one or more other base stations to transmit the one or more instances of the expression.

62. The apparatus of claim 54, wherein the processing system is further configured to transmit the expression set to one or more other base stations to allow the one or more other base stations to process the expression set and transmit the one or more instances of the expression.

* * * * *